US011563576B2

(12) United States Patent
Shimoni et al.

(10) Patent No.: US 11,563,576 B2
(45) Date of Patent: Jan. 24, 2023

(54) DISTRIBUTED ANONYMOUS SCORING TECHNIQUE

(71) Applicant: International Business Machines Corporation, Armonk, NY (US)

(72) Inventors: Yishai Shimoni, Givatayim (IL); Ehud Karavani, Giv'at Ye'arin (IL); Sivan Ravid, Tel-Aviv (IL); Matan Yitshak Ninio, Tel-Aviv (IL); Roie Melamed, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 16/254,626

(22) Filed: Jan. 23, 2019

(65) Prior Publication Data
US 2020/0235927 A1    Jul. 23, 2020

(51) Int. Cl.
*G06F 21/62* (2013.01)
*H04L 9/08* (2006.01)
*H04L 9/30* (2006.01)
*G06N 20/00* (2019.01)

(52) U.S. Cl.
CPC ............. *H04L 9/30* (2013.01); *G06N 20/00* (2019.01)

(58) Field of Classification Search
CPC ..... H04L 9/30; H04L 2209/42; H04L 9/3239; H04L 2209/38; G06N 20/00
See application file for complete search history.

(56) References Cited

U.S. PATENT DOCUMENTS

| 5,466,159 | A | 11/1995 | Clark et al. |
| 2015/0089399 | A1 | 3/2015 | Megill et al. |
| 2015/0379429 | A1* | 12/2015 | Lee ........................ G06N 20/00 706/11 |

(Continued)

FOREIGN PATENT DOCUMENTS

CA          3087900 A1 *  10/2020  ........... G06Q 20/401

OTHER PUBLICATIONS

Huayun Tang; Yingying Jiao; Butian Huang; Changting Lin; "Learning to Classify Blockchain Peers According to Their Behavior Sequences"; IEEE; Open Access Journal; Dec. 18, 2018; pp. 71208-71215 (Year: 2018).*

(Continued)

*Primary Examiner* — Kendall Dolly
*Assistant Examiner* — Courtney D Fields
(74) *Attorney, Agent, or Firm* — Barry D. Blount (57) ABSTRACT

In some examples, a system for implementing a protocol for data transmission can include a processor to transmit a public key or an encrypted name to a ledger of a source computing device and receive a scoring code, training data, and data definitions from the source computing device. The processor can also transmit predicted labels encrypted with the public key to the source computing device, the predicted labels based on the training data and the data definitions, and receive labeled test data from the source computing device. The processor can also transmit decrypted predicted labels to the source computing device, receive a list of evaluation results from a set of remote computing devices, transmit scoring results based on the list of evaluation results to the set of remote computing devices, and execute an instruction based on a techniques corresponding to a highest score from the scoring results.

20 Claims, 8 Drawing Sheets

(56) References Cited

U.S. PATENT DOCUMENTS

2018/0181953 A1* 6/2018 Lacoss-Arnold .... G06Q 20/027
2019/0230073 A1* 7/2019 Patel .................... H04L 9/0869
2019/0370866 A1* 12/2019 Lawbaugh ......... G06Q 30/0254

OTHER PUBLICATIONS

Olivier Blazy; Laura Brouilhet; Duong Hieu Phan; "Anonymous Identity Based Encryption with Traceable Identities"; ARES '19: Proceedings of the 14th International Conference on Availability, Reliability and Security; Aug. 2019, Article No. 13; pp. 1-10 (Year: 2019).*

Huayun Tang; Yingying Jiao; Butian Huang; Changting Lin; "Learning to Classify Blockchain Peers According to Their Behavior Sequences"; IEEE; Open Access Journal; Dec. 2018; pp. 71208-71215 (Year: 2018).*

Acharya et al., "Blockchain Based Examination System for Effective Evaluation and Maintenance of Examination Records", International Journal of Engineering & Technology, 7 (2.6), 2018, pp. 269-274.

Gilbert et al., "Collaborative Scoring with Dishonest Participants", Proceeding SPAA '10 Proceedings of the twenty-second annual ACM symposium on Parallelism in algorithms and architectures, 2010, pp. 41-49.

* cited by examiner

DISTRIBUTED ANONYMOUS SCORING TECHNIQUE

BACKGROUND

The present disclosure relates to distributed anonymous scoring techniques, and more specifically, but not exclusively, to implementing a protocol for data transmission of scores to enable executing instructions with an efficient technique.

SUMMARY

According to an embodiment described herein, a system for implementing a protocol for data transmission can include a processor to transmit a public key or an encrypted name to a ledger residing on a source computing device, the ledger enabling a read-only feature to prevent modifying previously submitted information to the ledger. The processor can also receive a scoring code, test data, and data definitions from the source computing device and transmit predicted labels encrypted with the public key to the source computing device, the predicted labels based on the test data and the data definitions. Additionally, the processor can receive labeled test data from the source computing device, transmit decrypted predicted labels to the source computing device, and receive a list of evaluation results from a set of remote computing devices, the list of evaluation results comprising results before receiving labeled test data. Furthermore, the processor can transmit scoring results based on the list of evaluation results to the set of remote computing devices, the results for the scoring results verified with the public key, and execute an instruction based on a techniques corresponding to a best or highest score from the scoring results.

In some embodiments, a method for implementing a protocol for data transmission can include transmitting a public key or an encrypted name to a ledger residing on a source computing device, the ledger enabling a read-only feature to prevent modifying previously submitted information to the ledger. The method can also include receiving a scoring code, test data, and data definitions from the source computing device and transmitting predicted labels encrypted with the public key to the source computing device, the predicted labels based on the test data and the data definitions. Additionally, the method can include receiving labeled test data from the source computing device, transmitting decrypted predicted labels to the source computing device, and receiving a list of evaluation results from a set of remote computing devices, the list of evaluation results comprising results before receiving labeled test data. Furthermore, the method can include transmitting scoring results based on the list of evaluation results to the set of remote computing devices, the results for the scoring results verified with the public key, and executing an instruction based on a techniques corresponding to a best or highest score from the scoring results.

In yet another embodiment, a computer program product for implementing a protocol for data transmission can include a computer readable storage medium having program instructions embodied therewith, wherein the computer readable storage medium is not a transitory signal per se. The program instructions can be executable by a processor to cause the processor to transmit a public key or an encrypted name to a ledger residing on a source computing device, the ledger enabling a read-only feature to prevent modifying previously submitted information to the ledger. The program instructions can also be executable by a processor to cause the processor to receive a scoring code, test data, and data definitions from the source computing device and transmit predicted labels encrypted with the public key to the source computing device, the predicted labels based on the test data and the data definitions. Additionally, the program instructions can be executable by a processor to cause the processor to receive labeled test data from the source computing device, transmit decrypted predicted labels to the source computing device, and receive a list of evaluation results from a set of remote computing devices, the list of evaluation results comprising results before receiving labeled test data. Furthermore, the program instructions can be executable by a processor to cause the processor to transmit scoring results based on the list of evaluation results to the set of remote computing devices, the results for the scoring results verified with the public key, and execute an instruction based on a techniques corresponding to a best or highest score from the scoring results.

DETAILED DESCRIPTION

Analyzing and evaluating data provided by computing devices attempting to solve a task can include various issues. For example, a source computing device or organizer can provide an established service for solving tasks from scientific, academic, and business entities. The source computing device can analyze and evaluate data provided from any suitable entity, which enables a reproducibility of results and a high degree of performance. However, the service provided by the source computing device can be subject to allegations of unfair advantage or unfair treatment due to a lack of transparency in the evaluation of the data.

The techniques herein enable a distributed collaborative scoring technique that can be implemented by a source computing device or by any number of participating remote devices. Accordingly, the techniques herein can be implemented with a centralized device or with decentralized devices. In some embodiments, the techniques herein can enable the execution of any suitable instruction, such as an instruction for a machine learning application, among others. A machine learning instruction can be related to natural language processing that can analyze and process natural language data such as words, numbers, and the like. The machine learning instruction can also include identifying objects from images, and generating responses to queries, among others.

As discussed in greater detail below in relation to FIGS. 1-5, in some embodiments, a source computing device can transmit a scoring code, training data, a public encryption key, and data definitions to a ledger accessible by any number of remote devices. The ledger can reside on the source computing device, on a remote device, or on any suitable external device. The source computing device can also transmit simulated data based on a random seed and encrypted ground truth data to the ledger accessible via the one or more remote devices. Additionally, the source computing device can transmit encrypted ground truth labels to the ledger. Furthermore, the source computing device can transmit decrypted ground truth labels to the ledger.

In some embodiments, a remote computing device can transmit a public key or an encrypted name to a source computing device. The remote computing device can receive a scoring code, training data, test data, and data definitions from the source computing device via the ledger, and transmit predicted labels encrypted with the public key to the source computing device, wherein the predicted labels are based on test data and the data definitions. The remote computing device can also receive labeled test data or decrypted ground truth labels from the source computing device via the ledger, transmit decrypted predicted labels to the source computing device via the ledger, and receive a list of evaluation results from a set of remote computing devices. In some examples, the list of evaluation results include data or results submitted to the ledger before receiving labeled test data. Furthermore, the remote computing device can transmit scoring results based on the list of evaluation results to the set of remote computing devices. In some embodiments, the scoring results can be verified with the public key. Moreover, the remote computing device can execute an instruction based on a techniques corresponding to a highest score from the scoring results.

Accordingly, the techniques herein enable any number of remote devices to evaluate data and provide scores and/or labels corresponding to a task while remaining anonymous. The techniques herein can also reduce the power consumption of devices by executing an instruction with an efficient technique that reduces a number of cycles of the processor. For example, the techniques herein can identify a machine learning technique for a task that executes a task with a reduced amount of memory, a reduced number of cycles of the processor, and the like. In some embodiments, the instructions of the machine learning technique can identify objects from images, or identify words from speech, among others.

Figure 1:
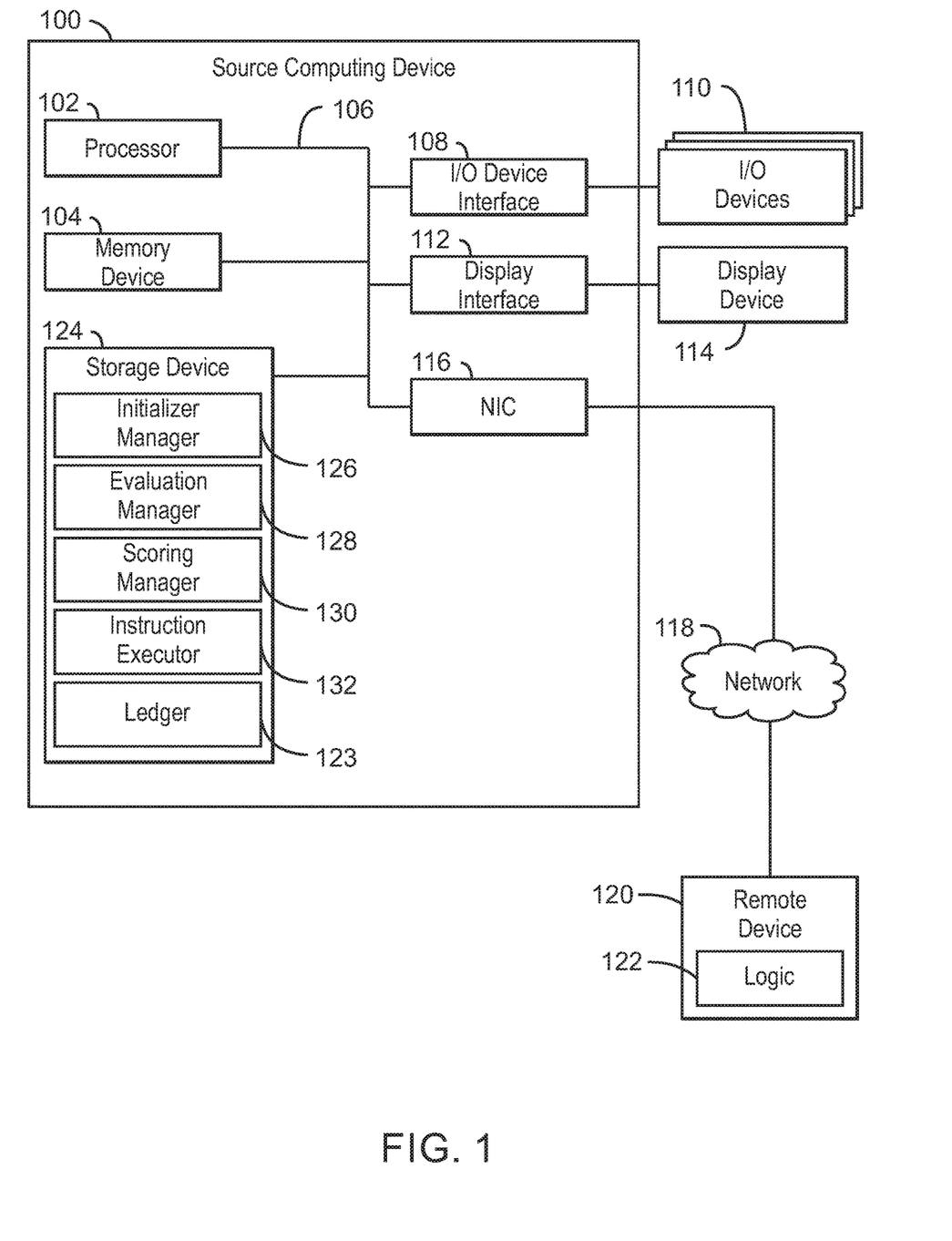
FIG. 1 depicts a block diagram of an example computing system that can implement a protocol for data transmission according to an embodiment described herein.

With reference now to FIG. 1, an example computing device is depicted that can implement a protocol for data transmission. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A remote device 120 may connect to the computing device 100 through the network 118. In some embodiments, the remote computing device 120 implements the process of analyzing and scoring data associated with a task. In some embodiments, the computing device 100 is a central server that processes and scores the data. In some examples, any number of remote computing devices 120 can connect to the computing device 100. In some embodiments, the remote computing devices 120 can be interconnected without the computing device 100.

In some embodiments, the remote device 120 can include logic 122, such as a hardware processor, to transmit a public key or an encrypted name to a source computing device 100 via a ledger 123. In some examples, the ledger 123 can reside in a storage device 124 of the computing device 100, on the remote device 120, or on any suitable external computing device accessible by the computing device 100 and the remote device 120. The ledger 123 can store data received from the source computing device 100 and any number of remote devices 120. Rather than communicating directly, the source computing device 100 and any number of remote devices 120 can store timestamped data in the ledger 123 in a read only format. The ledger 123 can prevent tampering with data.

In some embodiments, the logic 122 of the remote computing device 120 can receive a scoring code, test data, and data definitions from the ledger 123 stored on the source computing device 100, and transmit predicted labels encrypted with the public key to the ledger 123 of the source computing device 100, wherein the predicted labels are based on the test data and the data definitions. The logic 122 of the remote computing device 120 can also receive labeled test data from the ledger 123, transmit decrypted predicted labels to the ledger 123 of the source computing device, and receive a list of evaluation results from a set of remote computing devices via the ledger 123. Furthermore, the logic 122 of the remote computing device 120 can transmit scoring results based on the list of evaluation results to the set of remote computing devices via the ledger 123 and execute an instruction based on a techniques corresponding to a highest score from the scoring results.

In some examples, the processor 102 can be linked through the system interconnect 106 to the storage device 124, which can include an initializer manager 126, an evaluation manager 128, a scoring manager 130, and an instruction executor 132. In some embodiments, the initializer manager 126 can transmit a scoring code, training data, and data definitions to the ledger 123, which is accessible by one or more remote devices 120. The initializer manager 126 can also transmit simulated data based on a random seed and encrypted ground truth data to the ledger 123 accessible by one or more remote devices. Furthermore, the evaluation manager 128 can transmit decrypted labels to the ledger 123 and evaluate data and encrypted labels received from the one or more remove devices via the ledger 123. In addition, the scoring manager 130 can transmit scores of submissions to the one or more remote devices via the ledger 123. Also, the instruction executor 132 can execute an instruction based on a technique received from the one or more remote devices, the technique corresponding to a highest score.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the initializer manager 126, evaluation manager 128, scoring manager 130, and instruction executor 132 are partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the initializer manager 126, evaluation manager 128, scoring manager 130, and instruction executor 132 can be implemented with logic, wherein the logic, as referred to herein, can include any suitable hardware (e.g., a processor, among others), software (e.g., an application, among others), firmware, or any suitable combination of hardware, software, and firmware.

Figure 2:
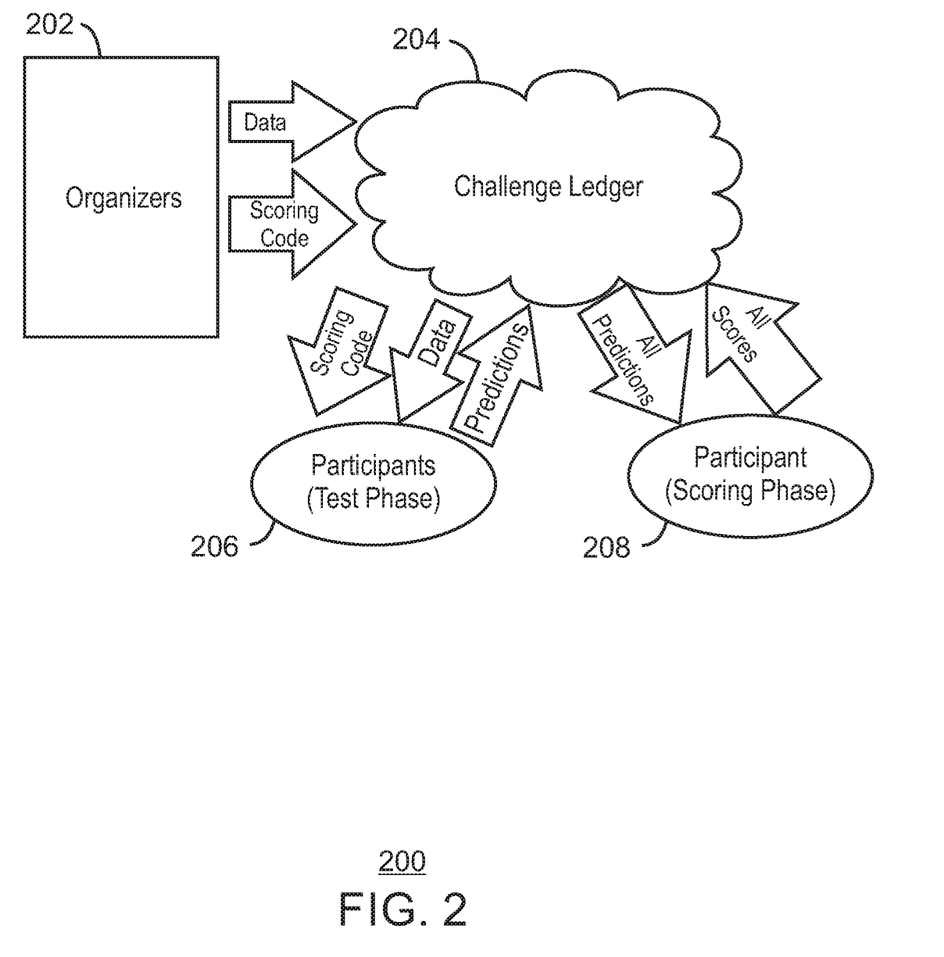
FIG. 2 depicts a block diagram of an example system that can implement a protocol for data transmission according to an embodiment described herein.

FIG. 2 depicts a block diagram of an example system that can implement a protocol for data transmission according to an embodiment described herein. In some embodiments organizers 202 are implemented by one or more source computing devices. The organizers 202 transmit data and a scoring code as a challenge or task that is stored in a ledger 204 accessible by participants 206 or remote computing devices. The participants 206 respond with predictions that solve the task during a test phase by sending the predictions to the ledger 204. In some embodiments, the organizers 202 then provide the decrypted ground truth labels to the ledger 204 accessible by each of the participants 206. In some embodiments, the participants 206 then generate scores and can provide the scores 208 to the organizers 202 via the ledger 204 during the scoring phase. Alternatively, the participants 206 can provide the scores 208 to the other participants 206 via the ledger 204. Accordingly, the participants 206 and/or organizers 202 provide transparency with the protocol described herein since the participants evaluate and generate the scores for the various solutions to the task using a decentralized and distributed technique.

Figure 3:
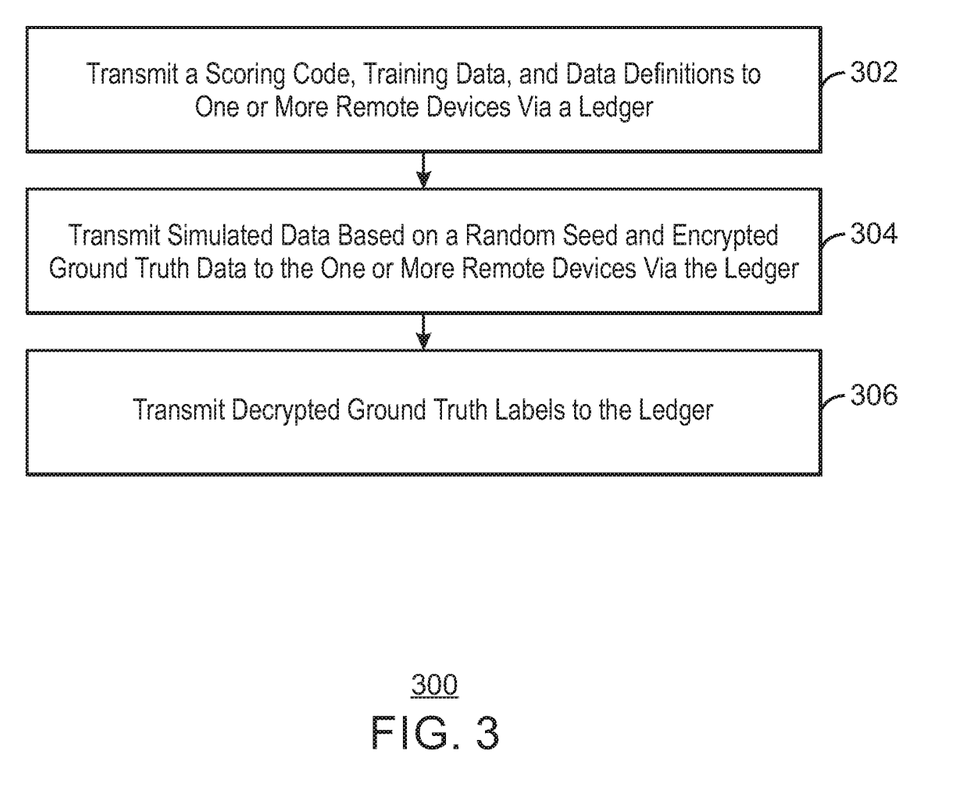
FIG. 3 is a process flow diagram of an example method that can implement a protocol for data transmission via a source computing device according to an embodiment described herein.

FIG. 3 is a process flow diagram of an example method that can implement a protocol for data transmission via a source computing device. The method 300 can be implemented with any suitable computing device, such as the computing device 100 of FIG. 1.

At block 302, the initializer manager 126 can transmit a scoring code, training data, public encryption key, test data, and data definitions to any number of remote devices via a ledger. In some embodiments, the ledger can receive data and share data from the initializer manager 126 and from the remove devices. The scoring code can indicate correct values or responses for questions associated with a task, a scoring scale with weighted values for answers, and the like. In some examples, the training data can include a set of values used to train machine learning techniques. For example, the training data can include a set of images, a set of audio or video files, a set of queries and responses, and the like. In some embodiments, the data definitions can indicate a format for the data, and any other suitable information corresponding to the data. In some examples, the data definitions can indicate features provided in the data such as an indication of multiple files, what the outcome should be, etc. In one example, the initializer manager 126 can indicate that the data includes image files in JPG format and that the data includes a single csv file containing two columns with the image name and the classification of each image. The test data can include images, videos, text, and the like, which are to be evaluated by remote devices or participants. For example, the test data can include images with objects, which the remote devices are to label.

At block 304, the initializer manager 126 can also transmit simulated data based on a random seed and encrypted ground truth data to one or more remote devices via the ledger. The simulated data can include a set of data values generated by a machine learning technique that solves a task. For example, the simulated data can indicate responses generated by a machine learning technique when a set of input values are provided to the machine learning technique. In some embodiments, the random seed is generated based on the participant public keys. In some examples, the public keys of all the participants or remote devices can be concatenated and a SHA256 code or checksum code can be generated, wherein the SHA256 code or the checksum can be used as the seed.

Alternatively, the initializer manager 126 can transmit non-simulated data to the one or more remote devices via the ledger. For example, the non-simulated data can include radiology images with labels assigned by radiologists. Accordingly, in some embodiments, the remote devices or participants can apply machine learning techniques in order to estimate labels, but the initializer manager 126 may not apply machine learning techniques to the data.

At block 306, the evaluation manager 128 can transmit decrypted ground truth labels to the ledger. In some embodiments, the evaluation manager 128 can generate scores for the decrypted ground truth labels by comparing the decrypted ground truth labels to labels received from remote devices. In some examples, the evaluation manager 128 transmits the decrypted ground truth labels to the ledger after remote devices have transmitted encrypted predicted labels to the ledger.

The process flow diagram of FIG. 3 is not intended to indicate that the operations of the method 300 are to be executed in any particular order, or that all of the operations of the method 300 are to be included in every case. Additionally, the method 300 can include additional operations. For example, the method 300 can include generating a time stamp for each label or scoring submission transmitted by a remote device to a source computing device or additional remote devices. Accordingly, the method 300 can include generating a distributed ledger of data transmitted from each of the remote devices with corresponding time stamps.

Figure 4:
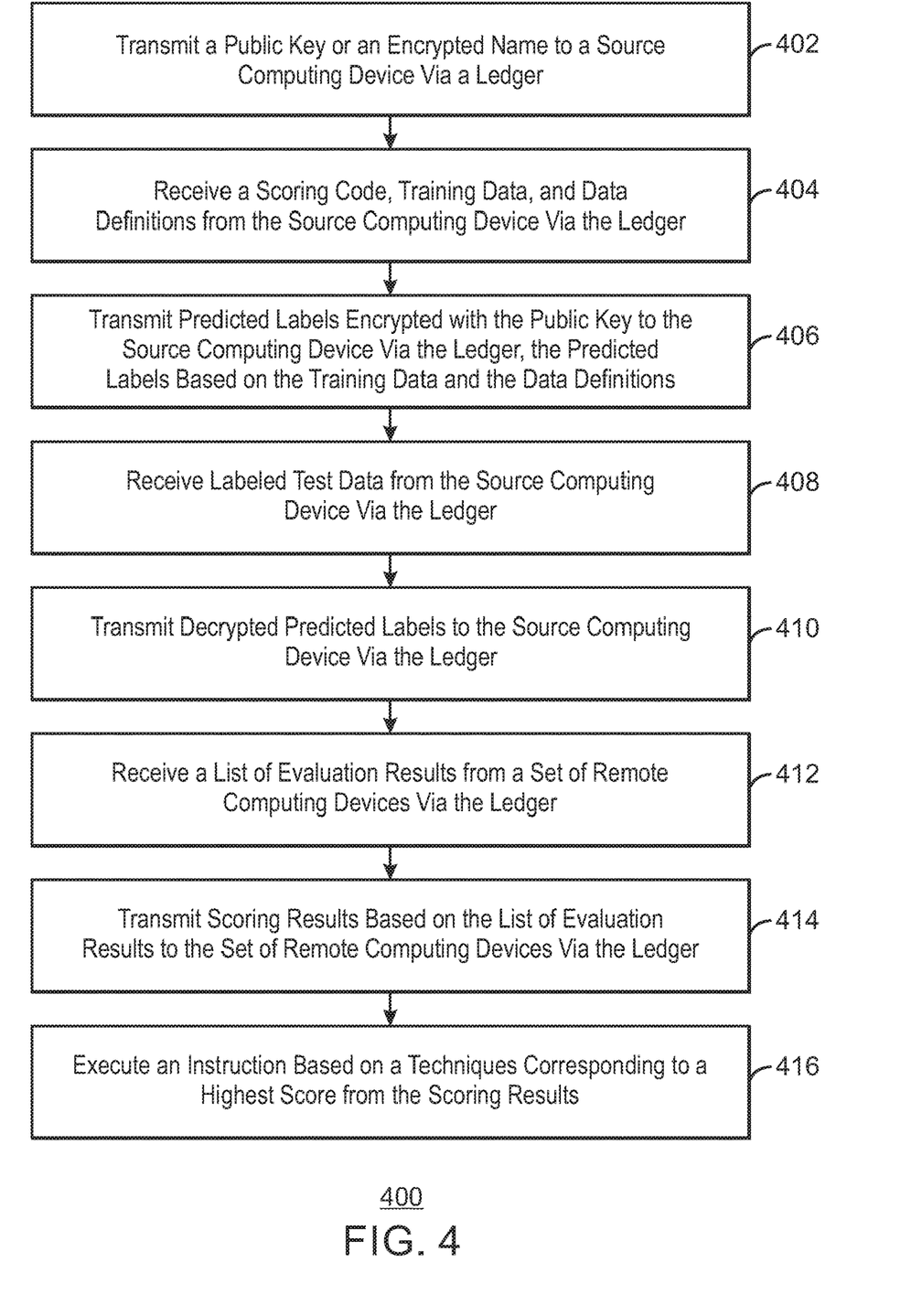
FIG. 4 is a process flow diagram of an example method that can implement a protocol for data transmission via a remote computing device according to an embodiment described herein.

FIG. 4 is a process flow diagram of an example method that can implement a protocol for data transmission via a remote computing device. The method 400 can be implemented with any suitable computing device, such as the computing device 120 of FIG. 1.

At block 402, logic in a remote computing device can transmit a public key or an encrypted name to a source computing device via a ledger, wherein the ledger enables a read-only feature to prevent modifying previously submitted information to the ledger. The public key or encrypted name can enable the remote computing device to maintain anonymity during the scoring process of a task. For example, the other remote devices in a decentralized system, or a source computing device in a centralized system, cannot determine a name or other identifying information about the remote computing device.

At block 404, logic in the remote computing device can receive a scoring code, training data, test data, and data definitions from the source computing device via the ledger. As discussed above, the scoring code can indicate correct values for questions associated with a task, a scoring scale with weighted values for answers, and the like. In some examples, the training data can include a set of values used to train machine learning techniques. For example, the training data can include a set of images, a set of audio or video files, a set of queries and responses, and the like. In some embodiments, the data definitions can indicate a format for the data, and any other suitable information corresponding to the data. The test data can include images, audio or video files, sets of queries, and the like, which are to be evaluated by the remote devices.

At block 406, logic in the remote computing device can transmit predicted labels encrypted with the public key to the source computing device via the ledger, wherein the predicted labels are based on the test data and the data definitions. The predicted labels can indicate the responses to tasks or questions to be scored. In some examples, the predicted labels can correspond to labels generated by machine learning techniques. For example, the predicted labels can indicate an identification of an object, a classification of an object, or a response to a query, among others. The predicted labels can be generated based on test data, such as a sample image. In some examples, the machine learning technique can be initialized or trained with the training data prior to generating the predicted label.

At block 408, logic in the remote computing device can also receive labeled test data from the source computing device via the ledger. In some examples, the labeled test data can enable the logic in the remote computing device to evaluate predicted labels provided by a set of remote computing devices. For example, the remote computing device can be competing against additional remote computing devices to solve a task. In some examples, the logic in the remote computing device can receive the labeled test data for a task following the submission of predicted labels for the task.

At block 410, logic in the remote computing device can transmit decrypted predicted labels to the source computing device via the ledger. The decrypted labels can enable the source computing device to generate a score. In some examples, other remote computing devices can alternatively generate scores with the decrypted predicted labels. The decrypted labels enable transparency as the scores are generated without a centralized device.

At block 412, logic in the remote computing device can receive a list of evaluation results from a set of remote computing devices via the ledger. The list of evaluation results can include results transmitted to the ledger before receiving labeled test data. The evaluation results can include scores for responses to a task, an accuracy of predicted labels for a machine learning task, and the like. In some examples, the source computing device can distribute the evaluation of the decrypted labels to the set of remote computing devices via the ledger. In some examples, the source computing device can evaluate the decrypted predicted labels for a task.

At block 414, logic in the remote computing device can transmit scoring results based on the list of evaluation results to the set of remote computing devices via the ledger. The scoring results can indicate an accuracy of responses generated by each remote computing device for a task or question. In some examples, the scoring results are based on the scoring code initially submitted to the remote computing devices. The evaluation results for the scoring results can be verified with the public key. In some examples, a subset of remote devices can submit the scores for evaluation.

In some embodiments, the logic can compare decrypted labels that identify objects in sample images to the correct labels that include the actual objects in the sample images. The scores can include any percentage of correct decrypted labels provided by the remote devices, weighted averages of correct decrypted labels based on the difficulty of each task or question within a task, and the like. In some examples, the logic can transmit scores for all of the remote device to the ledger. Accordingly, each remote device can have access to the scores of all the participants. In some examples, the highest score corresponds to a unanimous score designated by the one or more remote devices. In some examples, the highest score corresponds to the highest score designated by a majority of the one or more remote devices.

At block 416, logic in the remote computing device can execute an instruction based on a techniques corresponding to a highest score from the scoring results. For example, the logic can execute an instruction not related to machine learning techniques such as a mathematical operation comprising any number of operators and numbers, and the like. The logic can also execute a machine learning technique that can identify an object from an image, classify an object from an image, translate text or audio from a first language into a second language, and the like. In some examples, the instruction is executed by the subset of remote devices that provided the scores for evaluation.

The process flow diagram of FIG. 4 is not intended to indicate that the operations of the method 400 are to be executed in any particular order, or that all of the operations of the method 400 are to be included in every case. In some examples, the method 400 can include additional operations. For example, the method 400 can include transmitting a set of ground truth comparison values to the one or more remote devices, the set of ground truth comparison values corresponding to the simulated data. In some embodiments, the method 400 can include transmitting a proposal for a revised scoring code to the source computing device. For example, the revision to the scoring code can include using an absolute mean error instead of a root mean square error.

In some examples, the method 400 can be used by a scientific conference that issues a challenge to identify fractures from medical images. For example, an entity can provide X-ray images to remote devices. The remote devices or participants can use machine learning techniques to submit prediction labels (fracture/no fracture) in a single file. The prediction labels can be scored by each of the remote devices using the F1-score of their predictions compared to labels provided by a radiologist. In another example, the method 400 can be used by an administrator of an examination in a classroom setting. The administrator can submit a set of multiple-choice questions and how many points each question is worth to remote devices. The remote devices or participants, such as students, can then submit their answers and the answers can be scored by each of the remote devices.

Figure 5:
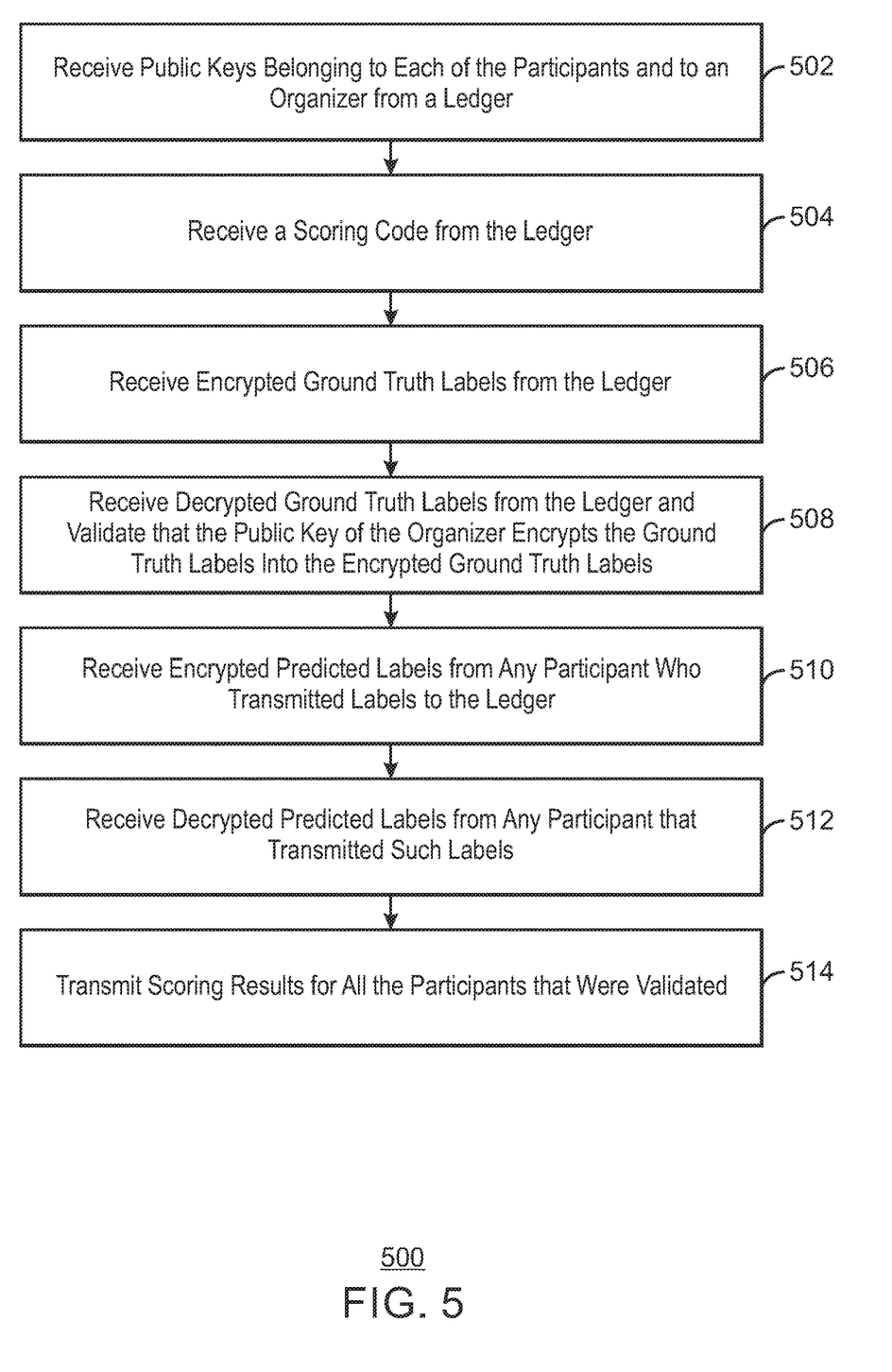
FIG. 5 is a process flow diagram of an example method that can implement a scoring protocol for data transmission via a remote computing device according to an embodiment described herein.

FIG. 5 is a process flow diagram of an example method that can implement a scoring protocol for data transmission via a remote computing device. The method 500 can be implemented with any suitable computing device, such as the computing device 100 or remote device 120 of FIG. 1.

At block 502, scoring manager 130 can receive public keys belonging to each of the participants and to an organizer from a ledger. For example, the ledger can be accessible by the organizer or source computing device and each of the remote devices or participants. Each device can have a separate public key used to encrypt data. In some embodiments, the scoring manager 130 can reside on the source computing device, a remote computing device, or a third party external device.

At block 504, scoring manager 130 can receive a scoring code from a ledger. For example, the scoring manager 130 can retrieve the scoring code submitted to the ledger by the organizer or source computing device.

At block 506, scoring manager 130 can receive encrypted ground truth labels from the ledger. The encrypted ground truth labels can include the correct labels or responses corresponding to test data transmitted to the ledger by the organizer or source computing device.

At block 508, scoring manager 130 can receive decrypted ground truth labels from the ledger and validate that the public key of the organizer encrypts the ground truth labels into the encrypted ground truth labels. In some examples, the scoring manager 130 can also transmit that there was data manipulation to the ledger if the public key cannot validate the encrypted ground truth labels and prevent execution of blocks 510-514 discussed below.

At block 510, scoring manager 130 can receive encrypted predicted labels from any participant who transmitted labels to the ledger. The scoring manager 130 can also validate that the transmission of these labels occurred before the organizer transmitted the decrypted ground truth labels.

At block 512, scoring manager 130 can receive decrypted predicted labels from any participant that transmitted such labels. In some embodiments, the scoring manager 130 receives decrypted predicted labels that can be validated with the public key as described above in relation to block 510. The scoring manager 130 can also validate that the public key of a remote device encrypts the predicted labels into the encrypted predicted labels.

At block 514, scoring manager 130 can transmit scoring results for all the participants that were validated at block 512 by comparing the decrypted ground truth labels and the decrypted predicted labels based on the scoring code submitted to the ledger. For example, the scoring manager 130 can generate a highest score based on the submitted data from the remote devise and store the highest score in the ledger.

The process flow diagram of FIG. 5 is not intended to indicate that the operations of the method 500 are to be executed in any particular order, or that all of the operations of the method 500 are to be included in every case. In some examples, the method 500 can include additional operations.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 6:
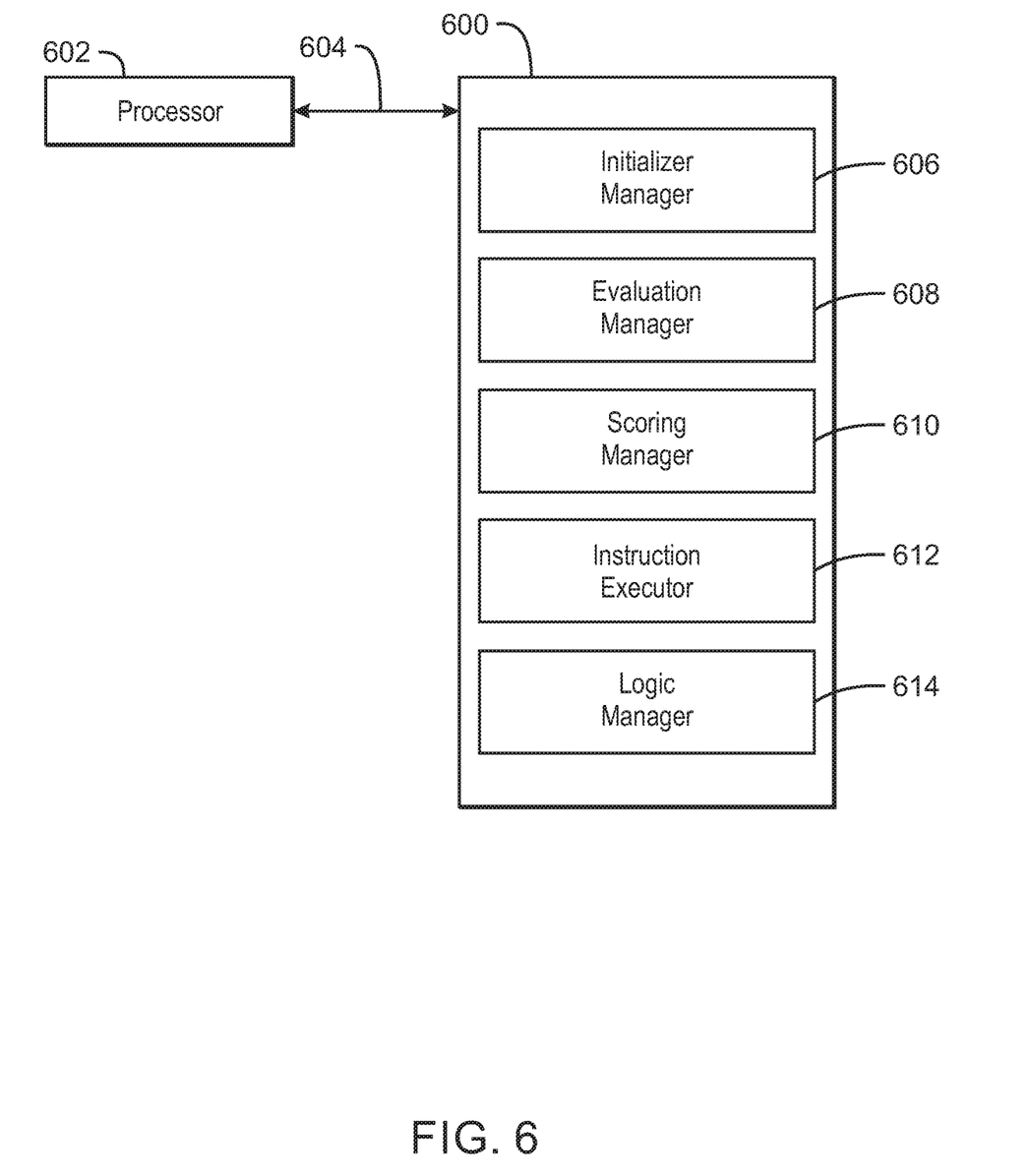
FIG. 6 is a tangible, non-transitory computer-readable medium that can implement a protocol for data transmission techniques according to an embodiment described herein.

Referring now to FIG. 6, a block diagram is depicted of an example of a tangible, non-transitory computer-readable medium that can implement a protocol for data transmission techniques. The tangible, non-transitory, computer-readable medium 600 may be accessed by a processor 602 over a computer interconnect 604.

Furthermore, the tangible, non-transitory, computer-readable medium 600 may include code to direct the processor 602 to perform the operations of the current method. For example, an initializer manager 606 can transmit a scoring code, training data, and data definitions to any number of remote devices via a ledger. The initializer manager 606 can also transmit simulated data based on a random seed and encrypted ground truth data to one or more remote devices via the ledger. Furthermore, an evaluation manager 608 can transmit decrypted labels to the ledger and can evaluate data and encrypted labels received provided from the one or more remove devices to the ledger. In addition, a scoring manager 610 can transmit scores of submissions to the one or more remote devices via the ledger. Also, an instruction executor 612 can execute an instruction based on a technique received from the one or more remote devices, the technique corresponding to a highest score.

The non-transitory, computer-readable medium 600 may also include code to direct the processor 602 to perform the operations of logic of a remote device. For example, logic manager 614 can transmit a public key or an encrypted name to a source computing device via a ledger. The logic manager 614 can receive a scoring code, training data, and data definitions from the source computing device, and transmit predicted labels encrypted with the public key to the source computing device, wherein the predicted labels are based on the test data and the data definitions. The logic manager 614 can also receive labeled test data from the source computing device, transmit decrypted predicted labels to the source computing device, and receive a list of evaluation results from a set of remote computing devices. Furthermore, the logic manager 614 can transmit scoring results based on the list of evaluation results to the set of remote computing devices and execute an instruction based on a techniques corresponding to a highest score from the scoring results.

It is to be understood that any number of additional software components not shown in FIG. 6 may be included within the tangible, non-transitory, computer-readable medium 600, depending on the specific application. Furthermore, fewer software components than those shown in FIG. 6 can be included in the tangible, non-transitory, computer-readable medium 600.

Figure 7:
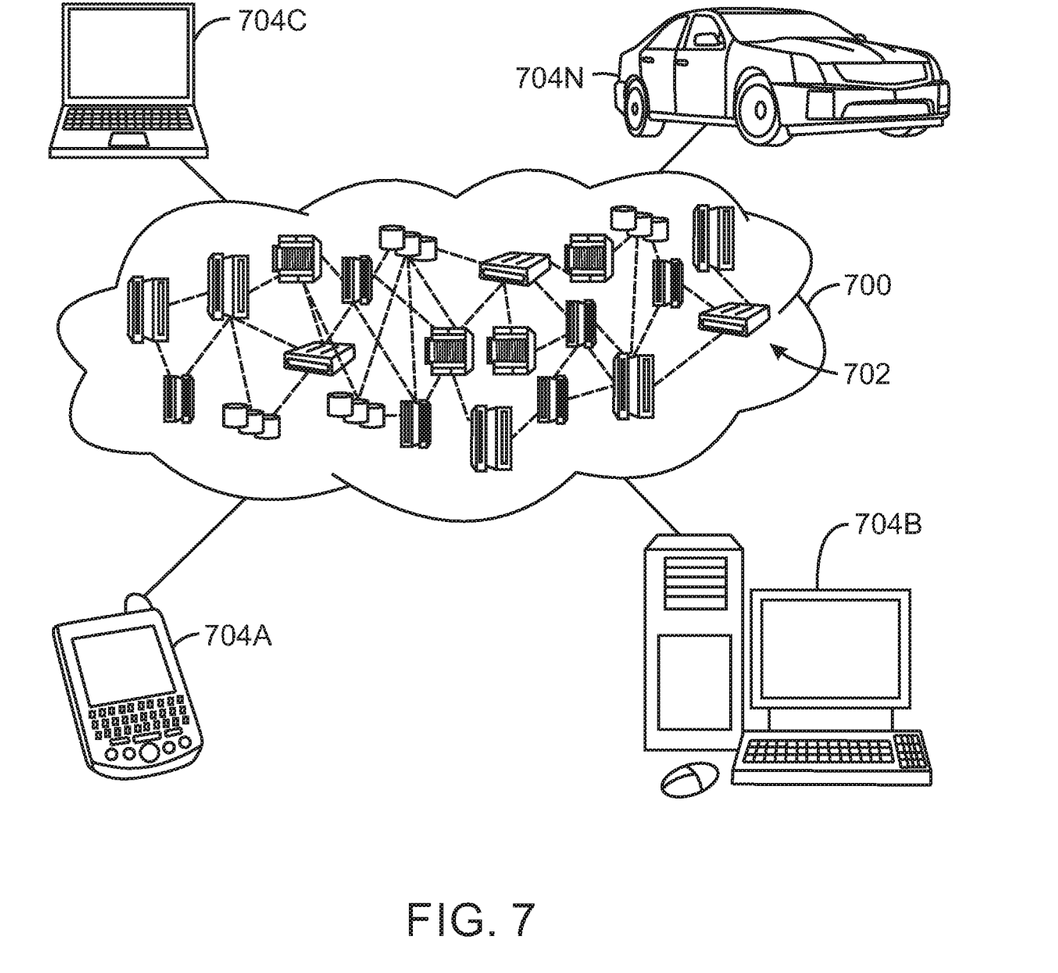
FIG. 7 depicts an illustrative cloud computing environment according to an embodiment described herein.

Referring now to FIG. 7, illustrative cloud computing environment 700 is depicted. As shown, cloud computing environment 700 comprises one or more cloud computing nodes 702 with which local computing devices used by cloud consumers, such as, for example, personal digital assistant (PDA) or cellular telephone 704A, desktop computer 704B, laptop computer 704C, and/or automobile computer system 704N may communicate. Nodes 702 may communicate with one another. They may be grouped (not shown) physically or virtually, in one or more networks, such as Private, Community, Public, or Hybrid clouds as described hereinabove, or a combination thereof. This allows cloud computing environment 700 to offer infrastructure, platforms and/or software as services for which a cloud consumer does not need to maintain resources on a local computing device. It is understood that the types of computing devices 704A-N shown in FIG. 7 are intended to be illustrative only and that computing nodes 702 and cloud computing environment 700 can communicate with any type of computerized device over any type of network and/or network addressable connection (e.g., using a web browser).

Figure 8:
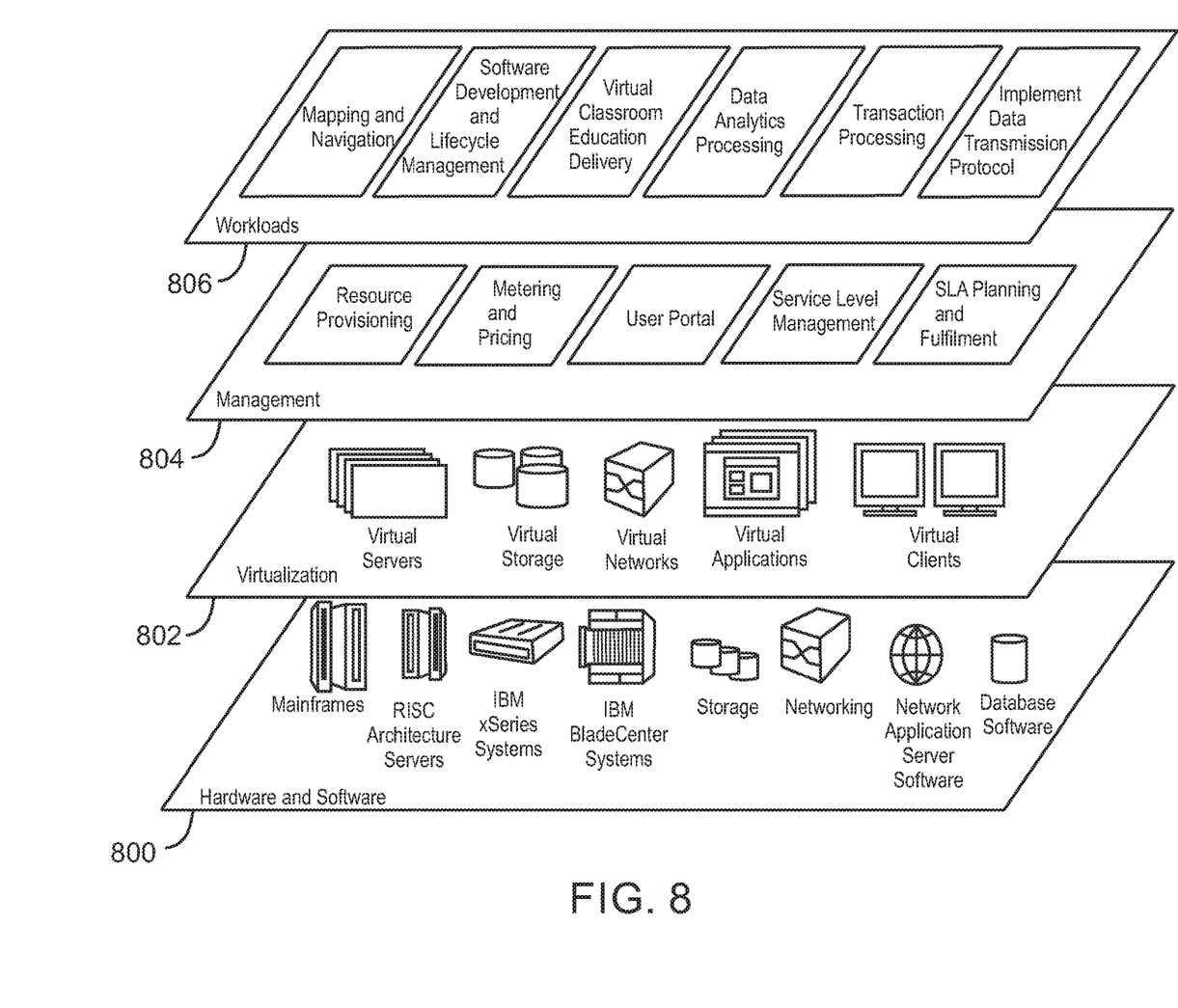
FIG. 8 depicts a set of functional abstraction layers provided by a cloud computing environment according to an embodiment described herein.

Referring now to FIG. 8, a set of functional abstraction layers provided by cloud computing environment 700 (FIG. 7) is shown. It should be understood in advance that the components, layers, and functions shown in FIG. 8 are intended to be illustrative only and embodiments of the invention are not limited thereto. As depicted, the following layers and corresponding functions are provided.

Hardware and software layer 800 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 802 provides an abstraction layer from which the following examples of virtual entities may be provided: virtual servers; virtual storage; virtual networks, including virtual private networks; virtual applications and operating systems; and virtual clients. In one example, management layer 804 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 806 provides examples of functionality for which the cloud computing environment may be utilized. Examples of workloads and functions which may be provided from this layer include: mapping and navigation; software development and lifecycle management; virtual classroom education delivery; data analytics processing; transaction processing; and implementing a protocol for data transmission techniques.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for implementing a protocol for data transmission comprising:
   a memory for storing executable instructions and a hardware processor to execute the executable instructions to:
   transmit a public key or an encrypted name to a ledger residing on a source computing device, the ledger enabling a read-only feature to prevent modifying previously submitted information to the ledger;
   receive a scoring code, unlabeled test data generated from a random seed based on a plurality of public keys comprising the public key, and data definitions from the source computing device;
   transmit predicted labels encrypted with the public key to the source computing device, the predicted labels generated based on the unlabeled test data and the data definitions;
   receive labeled test data from the source computing device;
   transmit decrypted predicted labels to the source computing device;
   receive a list of evaluation results from a set of remote computing devices associated with the plurality of public keys, the list of evaluation results comprising results before receiving the labeled test data;
   transmit scoring results based on the list of evaluation results to the set of remote computing devices, the evaluation results corresponding to the scoring results to be verified with the public key; and
   execute an instruction based on a techniques corresponding to a highest score from the scoring results.

2. The system of claim 1, wherein the source computing device is to:
   transmit the scoring code, the training data, the public key, and the data definitions to the ledger;
   transmit simulated data based on a random seed and encrypted ground truth labels to the ledger; and
   transmit decrypted ground truth labels to the ledger.

3. The system of claim 1, wherein the technique is a machine learning technique.

4. The system of claim 1, wherein the highest score corresponds to a unanimous score designated by the set of remote computing devices.

5. The system of claim 1, wherein the highest score corresponds to the highest score designated by a majority of the set of remote computing devices.

6. The system of claim 1, wherein the set of remote computing devices are to remain anonymous.

7. The system of claim 1, wherein a subset of the remote computing devices submit the scores for evaluation.

8. The system of claim 7, wherein the instruction is transmitted to the subset of remote computing devices that provided the scores for evaluation, the subset of remote computing devices to execute the instruction.

9. The system of claim 1, wherein the processor is to receive a set of ground truth comparison values from the source computing device, the set of ground truth comparison values corresponding to the simulated data.

10. The system of claim 1, wherein the processor is to transmit a proposal for a revised scoring code to the source computing device.

11. A method for implementing a protocol for data transmission comprising:
   transmitting a public key or an encrypted name to a ledger residing on a source computing device, the ledger enabling a read-only feature to prevent modifying previously submitted information to the ledger;
   receiving a scoring code, unlabeled test data generated from a random seed based on a plurality of public keys comprising the public key, and data definitions from the source computing device;
   transmitting predicted labels encrypted with the public key to the source computing device, the predicted labels generated based on the unlabeled test data and the data definitions;
   receiving labeled test data from the source computing device;
   transmitting decrypted predicted labels to the source computing device;
   receiving a list of evaluation results from a set of remote computing devices associated with the plurality of public keys, the list of evaluation results comprising results before receiving the labeled test data;
   transmitting scoring results based on the list of evaluation results to the set of remote computing devices, the evaluation results corresponding to the scoring results to be verified with the public key; and
   executing an instruction based on a techniques corresponding to a highest score from the scoring results.

12. The method of claim 11, wherein the source computing device is to:
   transmit the scoring code, the training data, the public key, and the data definitions to the ledger;
   transmit simulated data based on a random seed and encrypted ground truth labels to the ledger; and
   transmit decrypted ground truth labels to the ledger.

13. The method of claim 11, wherein the technique is a machine learning technique.

14. The method of claim 11, wherein the highest score corresponds to a unanimous score designated by the set of remote computing devices.

15. The method of claim 11, wherein the highest score corresponds to the highest score designated by a majority of the set of remote computing devices.

16. The method of claim 11, wherein the set of remote computing devices are to remain anonymous.

17. The method of claim 11, wherein a subset of the remote computing devices submit the scores for evaluation.

18. The method of claim 11, comprising transmitting a proposal for a revised scoring code to the source computing device.

19. A computer program product for implementing a protocol for data transmission comprising a computer readable storage medium having program instructions embodied therewith, wherein the computer readable storage medium is not a transitory signal per se, and wherein the program instructions, when executed by a processor, are to cause the processor to:
   transmit a public key or an encrypted name to a ledger residing on a source computing device, the ledger enabling a read-only feature to prevent modifying previously submitted information to the ledger;
   receive a scoring code, unlabeled test data generated from a random seed based on a plurality of public keys comprising the public key, and data definitions from the source computing device;
   transmit predicted labels encrypted with the public key to the source computing device, the predicted labels generated based on the unlabeled test data and the data definitions;
   receive labeled test data from the source computing device;
   transmit decrypted predicted labels to the source computing device;
   receive a list of evaluation results from a set of remote computing devices associated with the plurality of public keys, the list of evaluation results comprising results before receiving the labeled test data;
   transmit scoring results based on the list of evaluation results to the set of remote computing devices, the evaluation results corresponding to the scoring results to be verified with the public key; and
   execute an instruction based on a techniques corresponding to a highest score from the scoring results.

20. The computer program product of claim 19, wherein the technique is a machine learning technique.

* * * * *